3,751,475
PROCESS FOR THE PREPARATION OF POLY-ISOBUTENYL-SUBSTITUTED TETRAETHYL-ENEPENTAMINE

Henricus G. P. van der Voort and Willem P. de Jong, Amsterdam, Netherlands, assignors to Shell Oil Company, New York, N.Y.
No Drawing. Filed May 21, 1971, Ser. No. 145,938
Claims priority, application Netherlands, May 21, 1970, 7007392
Int. Cl. C07c 85/04, 87/20
U.S. Cl. 260—583 P     5 Claims

ABSTRACT OF THE DISCLOSURE

Hydrocarbyl polyamines exhibit improved detergent/dispersant properties as additives for lubricants and fuel oils when prepared by extracting the reaction product of a polyolefinic chlorohydrocarbon and an alkylenepolyamine with a liquid methanol or ethanol solution.

BACKGROUND OF THE INVENTION

The increasing demand for significant reduction in vehicular emissions requires that additives used in fuels and lubricants to inhibit and/or prevent the build-up of engine deposits must contain substituents that are not only suitable for this intended purpose but that are also themselves substantially free from contaminants and/or potential atmospheric pollutants.

In previous methods of preparing hydrocarbyl amines capable of imparting detergent characteristics to lubricants or fuels, a polyamine with a relatively low molecular weight is reacted with a monochlorohydrocarbon with a higher molecular weight. The amines thus formed were then washed once or several times with an aqueous liquid. In United Kingdom specification 1,094,020, for example, aqueous dilute solutions containing at least 10% wt. water are added to and/or used to wash the amines prior to phase separation as opposed to the elimination of water and extraction with a substantially anhydrous alkanol solution as disclosed herein. Furthermore, when hydrocarbons with a higher molecular weight such as polymers or copolymers of olefins are used in this process, not all the molecules present in such polymers or copolymers have the same molecular weight. Thus, such polymers after being chlorinated will not all have the same molecular weight and when such polymers are reacted with polyamine, some molecules will have a proportionately greater part which originated from the polyamine and consequently greater polar character than others. This is partially due also to the fact that more than one chlorinated polymer molecule can react on occasion with the same polyamine molecule. Polyamines prepared in the prior art manners have not been entirely successful in imparting desired degrees of detergency to lubricants and fuels in which they have been incorporated. This is apparently due to the fact that the amines themselves are impure, that is, contaminants have been picked up during the reaction and also to the extent that the washing procedure was inefficient in that it failed to remove molecules with undesirably high degrees of polarity which unfavorably influence the detergent action of the amines in lubricants or fuels and/or contained excess amounts of water during extraction or work-up of the polyamine.

THE INVENTION

This invention provides an improved process by which the suitability of alkylenepolyamines for use as additives in lubricants or fuels is increased. Such amines must be readily soluble in lubricants or fuels and at the same time appropriately polar to keep dirt particles and oleophobic deposits in a dispersed state or to disperse them. Therefore, it is imperative that the proportion and nature of the polar part of the amine (consisting of amino groups) and the nature and proportion of the non-polar part of the amine (consisting wholly or partly of hydrocarbon radicals) must be accurately matched in order to give optimum results in the improvement of the lubricants and fuels in which they are incorporated. These requirements must be taken into account in the preparation of the amines and consequently the choice of the starting materials for the preparation of the amines and the manner in which the amines obtained after their formation from the starting materials are worked up or purified are of great importance.

The invention thus relates particularly to a process for the preparation of amines eminently suitable for use as additives for lubricants and fuels, and also for hydrocarbon concentrates of these amines and to lubricant compositions and fuel compositions containing these amines.

Amines according to the invention are prepared by causing a polyisobutenylchloride with an average molecular weight between 600 and 2500 to react with alkylenepolyamine having the general formula

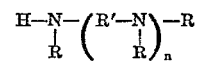

in which R is independently H or $CH_3$, R' is a $C_{2-3}$ alkylene radical and $n$ is a whole number from 1 to 5 inclusive, and extracting the reaction product with a liquid solution consisting essentially of substantially anhydrous $C_{1-2}$ alkanol, i.e., methanol or ethanol, or mixtures thereof.

The polyisobutenylchloride preferably contains one chloride atom per molecule and is obtained by any means known to the art. A convenient method is halogenating the hydrocarbon in question with molecular halogen without a solvent or in solution. Polyisobutenylchloride with an average molecular weight between 600 and 2500, and in particular between 800 and 2000, is preferred.

Alkylenepolyamines suitable for reacting with the polyisobutenylchloride are open-chain aliphatic amines containing at least two basic nitrogen atoms. These nitrogen atoms are substituted with hydrogen or methyl substituents. Examples of such suitable amines are ethylene-1,2-diamine, propylene-1,2 - diamine, propylene-1,3-diamine, and the monoalkyl, dialkyl and trialkyl derivatives of these amines, such as N,N - dimethylpropylene-1,3-diamine. Especially preferred polyethylenepolyamines are diethylenetriamine, triethylenetetraamine, and particularly tetraethylenepentamine. Also suitable are mixtures of alkylenepolyamines.

It is felt that the manner in which the amines according to the invention are extracted during workup with the $C_{1-2}$ alkanol solution is a significant factor in the improved detergent characteristics of amines according to the invention.

The reaction between the polyisobutenylchloride and the polyalkylenepolyamine can suitably be effected at a temperature between 20° C. and 200° C., preferably in an inert solvent or diluent, for instance, such as benzene, toluene, xylene, hexane, heptane, or mixtures of such hydrocarbons as fractions of mineral oils, for instance, gasolines. The reaction time will of course vary with temperature, pressure, etc., but will usually require less than twenty-four hours. Preferably, the molar quantities of the reactants are controlled in such a manner that per each mole of polyamine from 1 to 4 moles of the halohydrocarbon are present, so that amine products are obtained which on an average contain up to 4 hydrocarbon radicals originating from the halogen-containing hydrocarbon per molecule.

During the reaction, hydrogen chloride is liberated when the hydrocarbon is reacted to the polyamine, which would form a salt with any basic material present (e.g., polyamine). In the absence of special precautions, part of the polyamine present is withdrawn from the reaction with the halohydrocarbon. In order to prevent this undesirable reaction between hydrogen chloride and polyamine, the reaction between the polyamine and the halohydrocarbon is preferably affected in the presence of a basic substance as hydrogen-halide acceptor which differs from both the polyamine that is used as starting material and the amine to be formed and which preferably is a stronger base than the amine reactant or product. Generally, carbonates, bicarbonates, oxides and hydroxides may be used for this purpose. Alkali metal compounds such as sodium carbonate and potassium carbonate are preferred. One to two equivalents of such hydrogen-halide acceptors per gram atom of halogen in the halohydrocarbon are used in the reaction mixture.

After the reaction between the polyamine and the halogen-containing hydrocarbon is terminated, the mixture is extracted with a liquid solution containing a substantially anhydrous $C_{1-2}$ alkanol or mixtures thereof. However, prior to this the mixture obtained may be washed with water or a water containing liquid before it is extracted with the $C_{1-2}$ alkanol solution in order to remove any substances with a high degree of polarity, in particular unconverted polyamines and any basic substance which might have been added to the reaction mixture or any salts formed from the hydrogen chloride liberated. Suitable water-containing wash liquids consist, for example, of mixtures of water and lower alkanols such as methanol, ethanol, propanol, and isopropanol containing about 40 to 60% wt. water.

The liquid alkanol solution to be used for the extraction according to the invention containing methanol and/or ethanol, is substantially anhydrous, that is, contains not more than 5% wt. water, preferably not more than 1% wt. water. However, it may contain inert co-solvents, preferably non-polar hydrocarbons.

The mixture to be extracted is typically dissolved in a solvent which has poor miscibility with methanol and ethanol, as for example, an aromatic hydrocarbon, e.g., benzene, toluene, xylene and aliphatic hydrocarbon such as hexane, heptane, octane, and isooctane and cyclohexane, or a mixture of aliphatic and aromatic hydrocarbons, such as a mixture of toluene and hexane and oil fractions, such as gasolines, kerosenes, light and heavy oils, such as spindle oil, light machine oil, heavy machine oil or a residual oil. It has been found that for best results the mixture to be extracted must be free or substantially free from water when it is subjected to the extraction with the methanol and/or ethanol containing liquid. Should the mixture to be extracted contain water as a result of previous treatments, this water may be removed by distillation or in any other desired way. Extraction with the liquid solution of methanol and/or ethanol can be repeated once or several times or it may be performed continuously, e.g., with countercurrent product and extraction streams. The extraction may be effected at various temperatures, for instance, between 0 and 60° C., preferably between 15 and 35° C. The extraction may also be effected at various pressures but is usually effected at atmospheric pressure.

In general, the reaction product obtained according to the process of the invention is a highly viscous liquid and in order to facilitate handling, transport and proportioning it is normally dissolved in a solvent in such a manner that concentrates in the solvent are obtained.

Suitable solvents are hydrocarbons or mixtures thereof, such as fractions of mineral oils, for instance, gasoline, kerosene, gas oil, spindle oil, and the like and mixtures of alcohols and hydrocarbons as well as synthetic oils. Choice of solvent will be determined primarily by the liquid into which the amine is ultimately to be incorporated. If the amine is ultimately to be incorporated into a lubricating oil the solvent will in general be a lubricating oil fraction, for example, a spindle oil. If the amines are to be incorporated into light fuels it is generally recommended that solvents for the concentrate be components with a boiling range approximately similar to that of the fuel. If the amine is to be added to gasoline, a mixture of benzene or toluene and butanol is quite suitable. It also has been found that incorporation of a quantity of a heavy oil fraction, for instance, bright stock, in such a concentrate further enhances the engine performance of a gasoline in which the concentrate has been incorporated.

The quantity of amine which is incorporated into the concentrates varies between wide limits. In general, concentrations of the amine between 3% and 60% wt. are commonly used. In lubricants, particularly lubricating oils, the amines according to the process of the invention should have a concentration between 0.1 and 10% by weight. In fuel, in particular gasoline and aviation turbine fuels, the amines according to the invention should have a concentration between 0.001 and 0.1% wt. The amines may be dissolved as such in the lubricant or fuel in question but preferably the amine should be dissolved in said lubricant or fuel in the form of the above-described concentrates. In addition to aforementioned amines the fuels or lubricants, respectively, may contain other additives such as metal deactivators, antioxidants, anti-icing agents, ignition improvers and any other substances which are usually added to fuels, or such other additives as antioxidants, viscosity index improvers, anti-corrosion agents, anti-foam agents or any other such substances which are usually added to lubricants.

EXAMPLE I 4068 grams polyisobutenylchloride (molecular weight 1250 and chlorine content 2.90%), 229.8 grams tetraethylenepentamine (nitrogen content 34.7%), 362 grams anhydrous soda and 400 grams toluene were heated at 170° C. for seven hours. Water formed during the reaction was removed in the form of an azeotrope with the toluene and after condensation separated therefrom. The toluene thus obtained was recycled to the reaction mixture.

After cooling, 400 grams toluene and 2000 grams n-hexane were added to the mixture which was then washed four times with 2 liters of 1 part by volume of water and 1 part by volume of isopropanol. The amine solution thus obtained was divided into two equal parts. The solvents from part 1, i.e., toluene, hexane and any isopropanol and water left, were removed by evaporation at reduced pressure. The product thus obtained, amine A, not according to the invention, had a weight of 1866 grams, a chlorine content of 0.48%, a nitrogen content of 1.24% and a molecular weight of 2320.

The other part of the amine solution was partly evaporated at reduced pressure in order to remove any water still present. As pointed out above, it is essential to the invention, that is, if amines uncontaminated by impurities and with improved detergent characteristics are to be obtained, that any remaining moisture in the reaction mixture be removed prior to extraction with the methanol and/or ethanol solution. This was followed by dilution with 3500 grams n-hexane and extraction with 1800 grams anhydrous methanol. After the layers had been separated, the underlayer was diluted with 500 grams n-hexane and extracted with 1000 grams anhydrous methanol. This last operation was repeated twice. It is also pointed out again that the use of substantially anhydrous $C_{1-2}$ primary alcohols are essential to product quality and product purity. After the solvent had been removed at reduced pressure, the product, amine B, according to the invention, was obtained. It had a weight of 1827 grams, with a chlorine content of 0.49%, a nitrogen content of 1.21% and a molecular weight of 2720.

EXAMPLE II

In order to test both amines A and B under actual engine conditions equal quantities of A and B were dissolved to a concentration of 2% wt. in a high viscosity index (HVI) lubricating oil with a viscosity of 160s Redwood at 140° F. derived from a Middle East crude together with 3% wt. of a basic calcium alkyl salicylate, and 0.4% wt. of a zinc dialkyldithiophosphate. The lubricating oil compositions thus obatined were tested in a Petter AVI diesel engine, a Gardner IL 2 diesel engine and a CLR gasoline engine (in the last engine the oil compositions contained 0.7% wt. of the zinc dialkyldithiophosphate).

The tests in the Petter AVI diesel engine were performed according to the IP 175/69 specification of the Institute of Petroleum.

In the Gardner IL 2 single-cylinder engine the oils were tested in an engine that was run under constant conditions at a moderately high speed and load, with constant fuel supply. The temperature of the upper ring groove was maintained at 260° C.

In the CLR single-cylinder gasoline engine the modified MS sequence V conditions were applied, comprising a 45 minute period at 600 revolutions per minute, a cooling water temperature of 52° C. and a crankcase temperature of 38–51° C., followed by a two hour period of 1800 revolutions per minute, a cooling water temperature of 52° C. and a crankcase temperature of 71–76° C. This was repeated five times, after which the engine was shut off for a period of two hours and 15 minutes during which time cooling water of 96° C. was circulated; finally, the engine was left stationary for a period of 8 hours. This 24 hour cycle was repeated 14 times.

The results have been listed in the table shown below. It may readily be seen that oils containing amine B (according to the invention) are more capable of counteracting engine fouling than oils containing amine A (not according to the invention). Amine B is thus more capable of reducing the incidence of noxious emissions being exhausted into the atmosphere from vehicular and/or stationary engines.

TABLE

| Additive | Petter AVI | | Gardner average of ring grooves, walls and piston skirt [1] | CLR-VA sludge [2] |
|---|---|---|---|---|
| | Lacquer in ring grooves [1] | Lacquer at piston bottom [2] | | |
| A | 7.9 | 8.5 | 6.80 | 28.7 |
| B | 8.9 | 8.8 | 7.38 | 33.5 |

[1] 10=clean.  [2] 50=clean.

Other disclosed compositions, including fuel compositions, not exemplified in the above examples give equivalent, although not identical results.

What is claimed is:

1. A process for the preparation of a polyisobutenyl-substituted tetraethylenepentamine wherein (a) tetraethylenepentamine is reacted with a polyisobutenylchloride of an average molecular weight between 600 and 2500, in the presence of a hydrogen-halide acceptor selected from the group consisting of alkali metal carbonate, bicarbonate, oxide and hydroxide, at between 20 and 200° C. in an inert hydrocarbon solvent, (b) washing the resulting mixture in inert hydrocarbon medium with an aqueous alcoholic solution containing from about 40 to 60% by weight of water in which the alcohol is selected from the group consisting of methanol, ethanol, propanol, and isopropanol, (c) removing substantially all residual water from the mixture in inert hydrocarbon medium, (d) thereafter extracting the substantially water-free mixture in inert hydrocarbon medium with anhydrous methanol and (e) subsequently recovering said polyisobutenyl-substituted tetraethylenepentamine by isolating it from said inert hydrocarbon medium.

2. The process of claim 1 wherein said hydrogen-halide acceptor is sodium carbonate.

3. The process of claim 2 wherein said alcohol of (b) is isopropanol.

4. The process of claim 1 wherein said extraction is effected at a temperature between 15 and 35° C.

5. The process of claim 1 wherein said extraction is effected at atmospheric pressure.

References Cited
UNITED STATES PATENTS

| 3,574,576 | 4/1971 | Honnen et al. | 260—583 P |
| 3,454,555 | 7/1969 | Van der Voort et al. | 260—583 P |

JOSEPH P. BRUST, Primary Examiner